United States Patent
Iimuro et al.

(10) Patent No.: US 12,466,157 B2
(45) Date of Patent: Nov. 11, 2025

(54) MEMBER AND ITS MANUFACTURING METHOD

(71) Applicant: TOYOTA JIDOSHA KABUSHIKI KAISHA, Toyota (JP)

(72) Inventors: Haruhisa Iimuro, Toyota (JP); Masahiro Uchimura, Toyota (JP); Shunsuke Nara, Toyota (JP); Hidekazu Miyake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/541,130

(22) Filed: Dec. 15, 2023

(65) Prior Publication Data

US 2024/0227344 A1 Jul. 11, 2024

(30) Foreign Application Priority Data

Jan. 11, 2023 (JP) .................. 2023-002131

(51) Int. Cl.
*B32B 3/30* (2006.01)
*B23K 26/354* (2014.01)
(Continued)

(52) U.S. Cl.
CPC .............. *B32B 3/30* (2013.01); *B23K 26/354* (2015.10); *B32B 7/12* (2013.01); *B32B 15/043* (2013.01);
(Continued)

(58) Field of Classification Search
CPC ........ C09J 2475/00; C09J 175/04; C09J 5/00; B32B 2255/26; B32B 2255/06;
(Continued)

(56) References Cited

U.S. PATENT DOCUMENTS

2022/0032399 A1    2/2022   Uchimura et al.

FOREIGN PATENT DOCUMENTS

JP        2022-028587 A     2/2022
JP        2022-95441 A      6/2022
(Continued)

OTHER PUBLICATIONS

Machine translation of JP-2022-28587 (Year: 2022).*
Machine translation of JP-2022-95441 (Year: 2022).*

*Primary Examiner* — Vishal I Patel
(74) *Attorney, Agent, or Firm* — Sughrue Mion, PLLC

(57) ABSTRACT

A method for manufacturing a member, the member including: a first member made of a metal comprising a base material of which a surface is made of a material containing Al as a main component, and an irregular part formed as irregularities on the surface of the base material, the irregular part being made of the material used for the surface of the base material; and an adhesive layer formed on a surface of the irregular part, the adhesive layer comprising an adhesive formed therein, the adhesive having an isocyanate group for bonding the first member with a second member, the method including: forming the irregular part on the surface of the base material; applying the adhesive to the surface of the irregular part; and bonding the surface of the irregular part with the adhesive by drying the adhesive, and thereby forming the adhesive layer.

4 Claims, 6 Drawing Sheets

(51) Int. Cl.
  *B32B 7/12*    (2006.01)
  *B32B 15/04*   (2006.01)
  *B32B 15/20*   (2006.01)
  *C09J 5/00*    (2006.01)
  *C09J 175/04*  (2006.01)

(52) U.S. Cl.
  CPC ............. *B32B 15/20* (2013.01); *C09J 5/00* (2013.01); *C09J 175/04* (2013.01); *B32B 2255/06* (2013.01); *B32B 2255/26* (2013.01); *C09J 2475/00* (2013.01)

(58) Field of Classification Search
  CPC ......... B32B 15/20; B32B 15/043; B32B 7/12; B32B 3/30; B23K 26/354
  See application file for complete search history.

(56) References Cited

FOREIGN PATENT DOCUMENTS

| | | |
|---|---|---|
| JP | 2022-96454 A | 6/2022 |
| WO | 2020/256038 A1 | 12/2020 |

\* cited by examiner

MEMBER AND ITS MANUFACTURING METHOD

CROSS REFERENCE TO RELATED APPLICATIONS

This application is based upon and claims the benefit of priority from Japanese patent application No. 2023-002131, filed on Jan. 11, 2023, the disclosure of which is incorporated herein in its entirety by reference.

BACKGROUND

The present disclosure relates to a member and its manufacturing method.

In recent years, in order to improve adhesion between a metal member and another member, it has been considered to roughen the surface of the metal member by providing microscopic irregularities on the surface.

For example, Japanese Unexamined Patent Application Publication No. 2022-028587 discloses a metal member and its manufacturing method capable of improving adhesion with another member by providing microscopic irregularities on the surface of a base material in which a material containing at least one of Cu, Al, Sn, Ti, and Fe is used as a main component at least in the surface.

SUMMARY

It has been desired to further improve adhesion between a metal member and another member.

The present disclosure has been made in view of the above-described matter, and an object thereof is to provide a member and its manufacturing method capable of improving adhesion between a metal member and another member.

A method for manufacturing a member according to the present disclosure is a method for manufacturing a member, the member including: a first member made of a metal including at least a base material of which at least a surface is made of a material containing Al as a main component, and an irregular part formed as irregularities on the surface of the base material, the irregular part being made of the material used for the surface of the base material; and an adhesive layer formed on a surface of the irregular part, the adhesive layer includes an adhesive formed therein, the adhesive having an isocyanate group for bonding the first member with a second member, the method including: forming the irregular part on the surface of the base material; applying the adhesive to the surface of the irregular part; and bonding the surface of the irregular part with the adhesive applied to the surface of the irregular part by drying the adhesive, and thereby forming the adhesive layer. The above-described method for manufacturing a member can improve adhesion between the first member made of a metal and the second member by chemically bonding a hydroxyl group formed on the surface of the irregular part with an isocyanate group formed on the surface of the adhesive. That is, the above-described method for manufacturing a member can improve adhesion between a metal member and another member.

A member according to the present disclosure includes: a first member made of a metal including at least a base material of which at least a surface is made of a material containing Al as a main component, and an irregular part formed as irregularities on the surface of the base material, the irregular part being made of the material used for the surface of the base material; and an adhesive layer formed on a surface of the irregular part, the adhesive layer includes an adhesive formed therein, the adhesive having an isocyanate group for bonding the first member with a second member. The above-described member can improve adhesion between the first member made of a metal and the second member by chemically bonding a hydroxyl group formed on the surface of the irregular part with an isocyanate group formed on the surface of the adhesive. That is, the above-described member can improve adhesion between a metal member and another member.

According to the present disclosure, it is possible to provide a member and its manufacturing method capable of improving adhesion between a metal member and another member.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
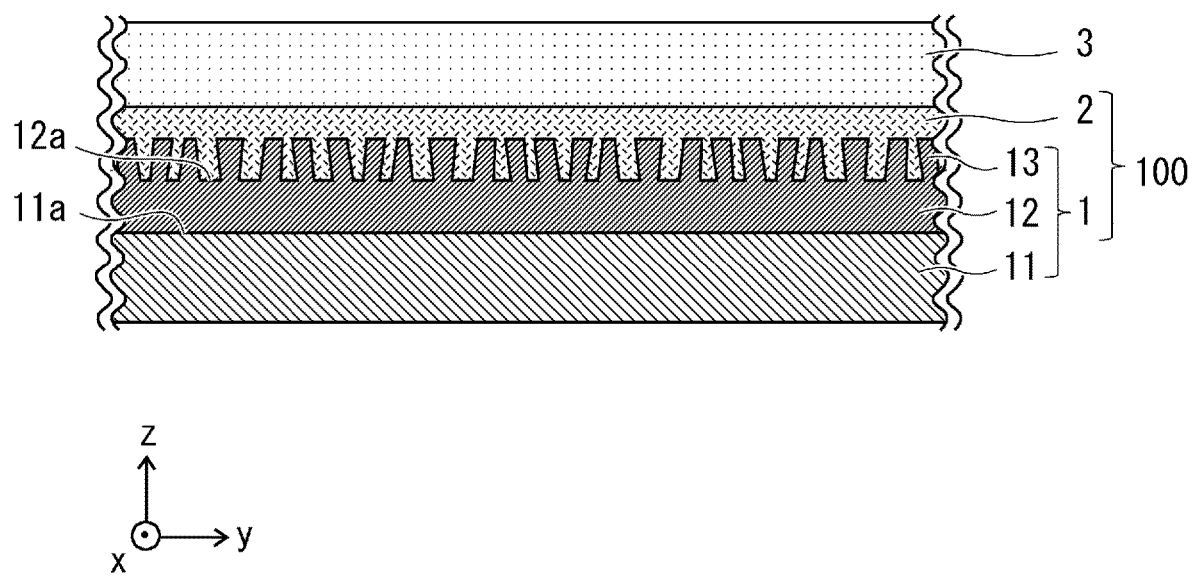
FIG. 1 is a schematic cross-sectional diagram of a member according to a first embodiment.

The present disclosure will be described hereinafter through embodiments, but the invention according to the claims is not limited to the below-shown embodiments. Further, all the components/structures described in an embodiment are not necessarily essential as means for solving the problem. For clarifying the explanation, the following descriptions and drawings are partially omitted and simplified as appropriate. The same reference numerals (or symbols) are assigned to the same elements throughout the drawings, and redundant descriptions are omitted as appropriate.

First Embodiment

FIG. 1 is a schematic cross-sectional diagram of a member 100 according to a first embodiment. A metal member (first member) in the member 100 is, for example, a housing part of a battery pack, and the housing part of the battery pack is covered by another member (second member) such as an upper plate. Therefore, in the member 100, it is required to improve adhesion between the metal member and the other member.

Specifically, as shown in FIG. 1, the member 100 includes the metal member 1 and the adhesive layer 2. The metal member 1 includes a base material 11, a thin metal film 12, and an irregular part 13. Note that FIG. 1 shows a member 3 in addition to the member 100.

The base material 11 is a flat plate-like member and is made of a conductive metal material such as Cu or Al. The thin metal film 12 is formed on a surface 11a of the base material 11. More specifically, the thin metal film 12 is formed on one of the main surfaces (front surface) of the base material 11. Note that the thin metal film 12 is made of a metal material containing Al, which has a melting point lower than those of Ni, Au, Pd, Ag, and the like, as a main component. Note that the thin metal film 12 may be considered to be a part of the base material 11. Further, the member 3 is made of, for example, a metal material containing Fe as a main component.

Further, the irregular part 13 having microscopic irregularities is formed on the surface 12a of the thin metal film 12. The irregular part 13 is formed as a part of the surface 12a of the thin metal film 12 is irradiated with a pulsed laser (pulsed laser beam), melted, evaporated, then transformed into particles, and deposited on the surface 12a of the thin metal film 12. Therefore, the irregular part 13 is made of a metal material containing the same metal (i.e., Al) as that of the thin metal film 12 as a main component. Further, a hydroxyl group is formed on the surface of the irregular part 13. Details of the method for forming an irregular part 13 will be described later.

Further, the adhesive layer 2, in which an adhesive 21 having an isocyanate group for bonding the metal member 1 with the member 3 is formed, is formed on the surface of the irregular part 13. The adhesive 21 having the isocyanate group is made of, for example, a material containing a urethane resin as a main component. Note that in the adhesive layer 2, a hydroxyl group formed on the surface of the irregular part 13 is chemically bonded with the isocyanate group formed on the surface of the adhesive 21. In other words, in the adhesive layer 2, the adhesive 21 is urethane-bonded with the irregular part 13. As a result, adhesion between the metal member 1 and the member 3 is improved.

As described above, in the member 100 according to this embodiment, the metal member 1 includes the irregular part 13 having microscopic irregularities on the surface 12a of the thin metal film 12. As a result, adhesion between the metal member 1 and the member 3 is improved. Further, in the member 100 according to this embodiment, the hydroxyl group formed on the surface of the irregular part 13 is chemically bonded with the isocyanate group formed on the surface of the adhesive 21. As a result, adhesion between the metal member 1 and the member 3 is further improved.

Method for Manufacturing Member 100

Figure 2:
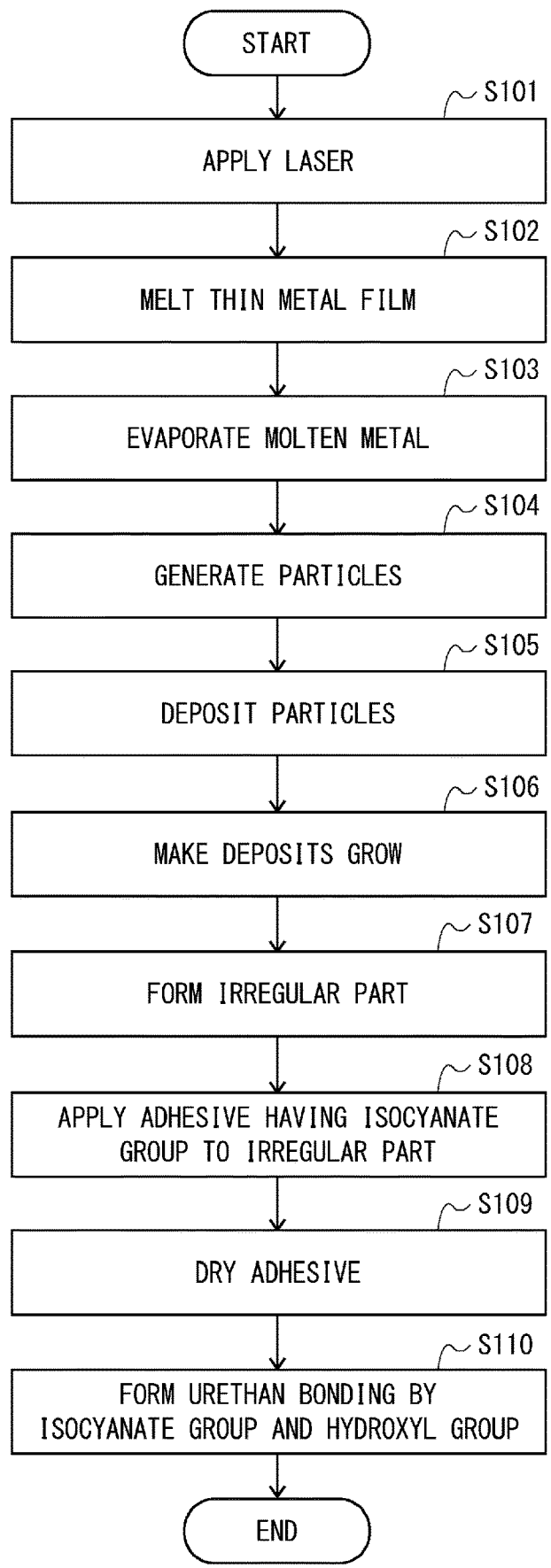
FIG. 2 is a flowchart showing a method for manufacturing the member shown in FIG. 1.
Figure 3:
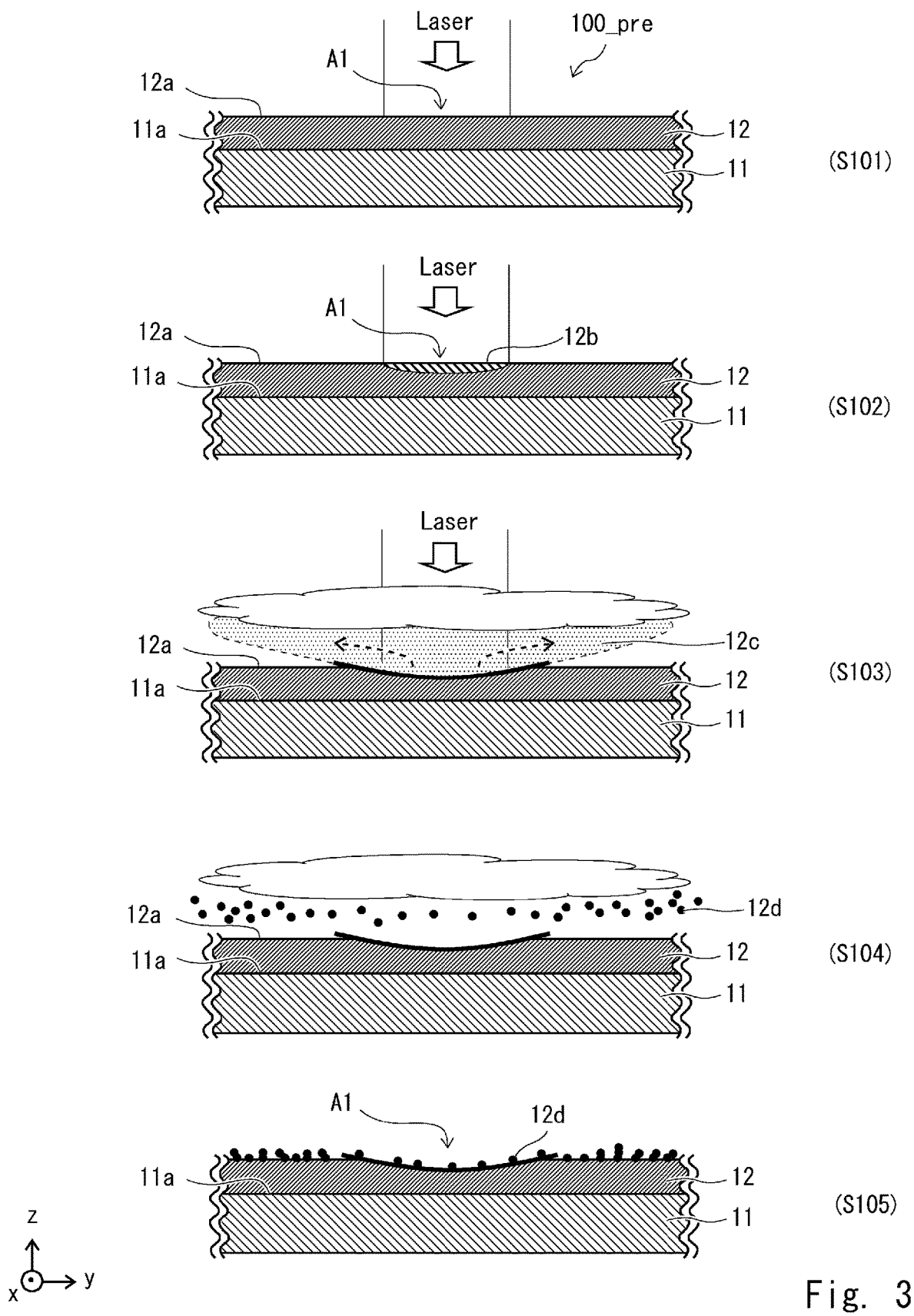
FIG. 3 shows schematic cross-sectional diagrams for explaining a method for manufacturing the member shown in FIG. 1.
Figure 4:
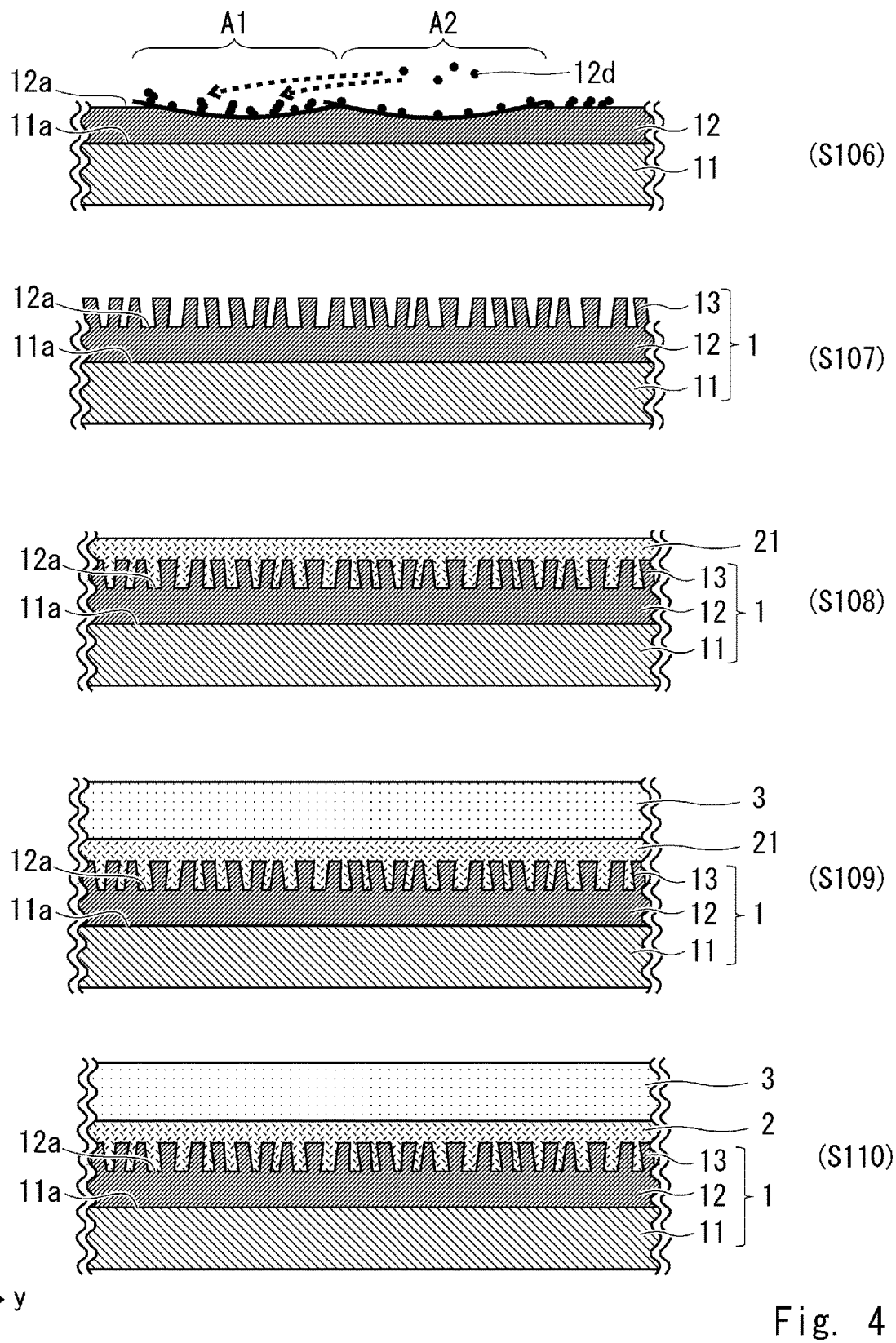
FIG. 4 shows schematic cross-sectional diagrams for explaining the method for manufacturing the member shown in FIG. 1.
Figure 5:
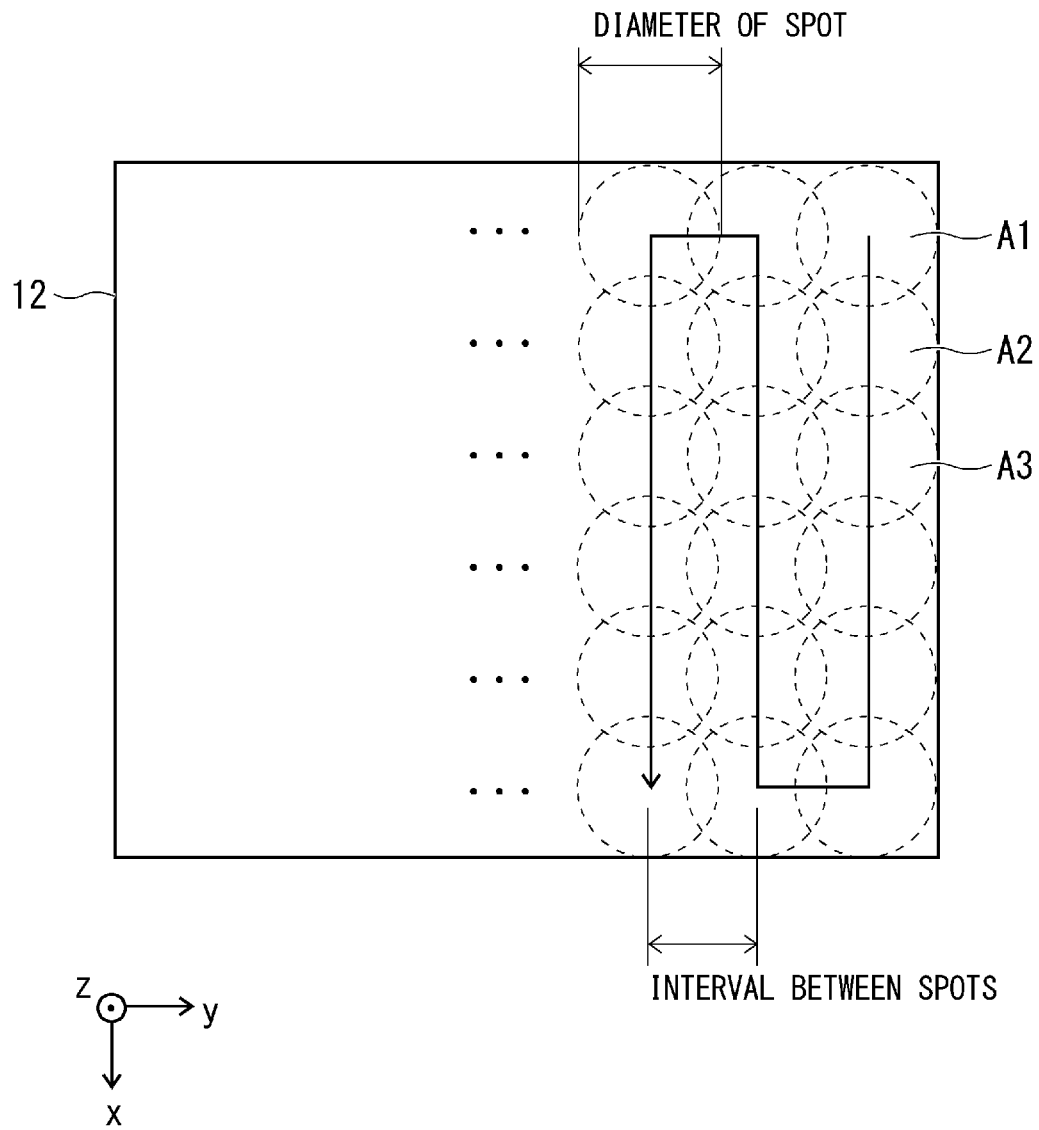
FIG. 5 is a schematic plan view for explaining a laser irradiation method that is used during the manufacturing of the member shown in FIG. 1.
Figure 6:
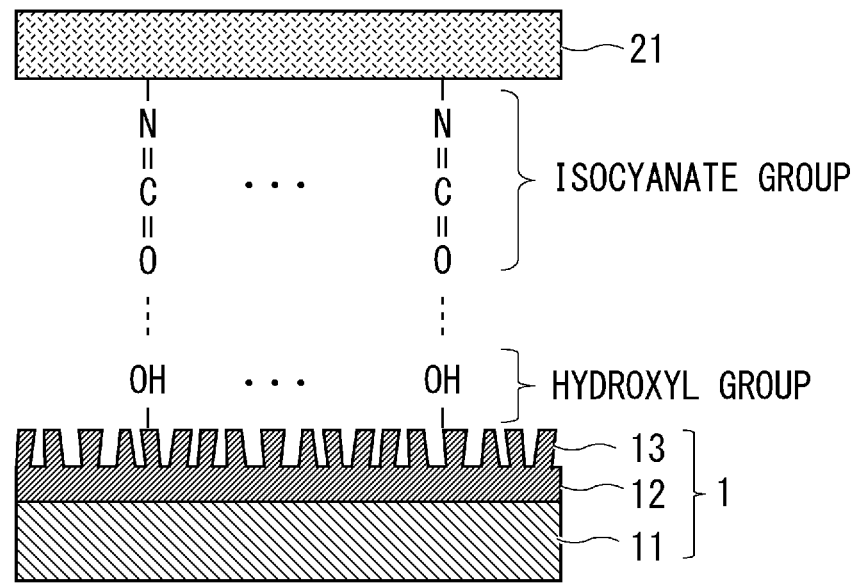
FIG. 6 shows schematic diagrams for explaining a method for bonding an irregular part with an adhesive in the member shown in FIG. 1.
Figure 6:
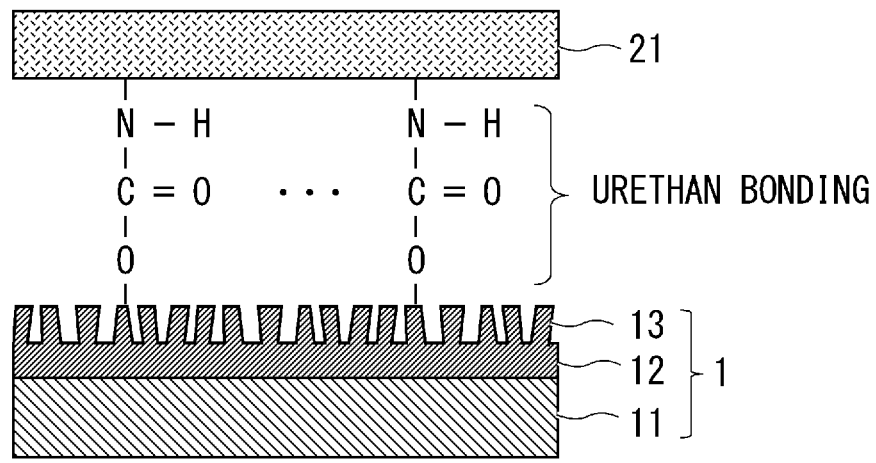
Figure 6:
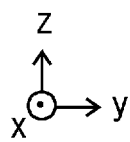

Next, a method for manufacturing a member 100 will be described with reference to FIGS. 2 to 6. FIG. 2 is a flowchart showing a method for manufacturing a member 100. FIGS. 3 and 4 show schematic cross-sectional diagrams for explaining a method for manufacturing a member 100. FIG. 5 is a schematic plan view for explaining a laser irradiation method that is used during the manufacturing of the member 100. FIG. 6 shows schematic diagrams for explaining a method for bonding an irregular part with an adhesive in the member 100. Note that the schematic cross-sectional diagrams for steps S101 to S110 in FIGS. 3 and 4 correspond to the processes in the steps S101 to S110, respectively, in FIG. 2.

Firstly, a metal member 1 in which an irregular part 13 has not been formed yet (hereinafter referred to as a metal member 1_pre) is prepared. Note that as described above, the thin metal film 12 provided in the metal member 1_pre is made of a metal material containing Al, of which the melting point is lower than those of Ni, Au, Pd, Ag, and the like, as a main component.

After that, a pulsed laser is applied to a predetermined area A1 on a surface 12a of a thin metal film 12 provided in the metal member 1_pre (Step S101). Note that the predetermined area A1 is, for example, an area that can be irradiated with a pulsed laser at once.

In this way, a part of the thin metal film 12 in the predetermined area A1 melts (Step S102). Hereinafter, the molten metal obtained by melting the thin metal film 12 is referred to as a molten metal 12b.

After that, the molten metal 12b evaporates and is released into a gas atmosphere (Step S103). Hereinafter, the vapor obtained by evaporating the molten metal 12b is referred to as a metal vapor 12c.

The metal vapor 12c remains in the gas atmosphere, and after a lapse of time, it condenses into particles, or reacts with a gas and forms particles (Step S104). Hereinafter, the particles transformed from the metal vapor 12c is called metal particles 12d.

After that, the metal particles 12d are deposited on the surface 12a (including the predetermined area A1) of the thin metal film 12 (Step S105).

After the metal particles 12d deposited in the predetermined area A1 solidifies, processes similar to those performed for the predetermined area A1 (processes in steps S101 to S105) are also performed for a predetermined area A2 adjacent to the predetermined area A1 on the surface 12a of the thin metal film 12. As a result, the metal in the predetermined area A2 melts, evaporates, and then are transformed into particles and are deposited on the deposits in the predetermined area A1. In other words, the deposits in the predetermined area A1 grow by the deposition of particles coming from the predetermined area A2 (Step S106).

Note that these metal particles are not deposited in the part of the deposits in the predetermined area A1 that is shadowed in the scattering direction of metal particles flying from the adjacent area (shadowing effect). Therefore, the deposits in the predetermined area A1 do not become too small and grow so as to, for example, have irregularities in the order of nm.

After the metal particles 12d deposited in the predetermined area A2 solidifies, processes similar to those performed for the predetermined areas A1 and A2 are also performed for a predetermined area A3 adjacent to the predetermined area A2 on the surface 12a of the thin metal film 12. As a result, the metal in the predetermined area A3 melts, evaporates, and then are transformed into particles and are deposited on the deposits in the predetermined area A2. In other words, the deposits in the predetermined area A3 grow by the deposition of particles coming from the predetermined area A2. The above-described series of processes is repeated in all or a part of the area on the surface 12a of the thin metal film 12 (see FIG. 5).

Through the above-described steps, the irregular part 13 is formed in the metal member 1 (Step S107).

Note that although the case where the molten metal 12b evaporates and are transformed into the metal vapor 12c in the process in the step S103 has been described as an example in this embodiment, the present disclosure is not limited to this example. In the process in the step S103, the molten metal 12b may be transformed into metal plasma. In this case, the metal plasma is released into a plasma atmosphere.

After that, the adhesive 21 having an isocyanate group is applied to the surface of the irregular part 13 (Step S108).

After that, the member 3 is disposed on the applied adhesive 21 and the adhesive is dried (Step S109). As a result, the hydroxyl group formed on the surface of the irregular part 13 is chemically bonded with the isocyanate group formed on the surface of the adhesive 21 (Step S110). In other words, the adhesive 21 is urethane-bonded with the irregular part 13 (see FIG. 6). As a result, adhesion between the metal member 1 and the member 3 is improved.

As described above, in the method for manufacturing a member 100 according to this embodiment, the metal in the predetermined area A1 on the surface 12a of the thin metal film 12 melts and evaporates by irradiation with a pulsed laser, and then are transformed into particles and are deposited in the predetermined area A1. Next, the metal in the predetermined area A2 adjacent to the predetermined area A1 on the surface 12a of the thin metal film 12 melts and evaporates by irradiation with a pulsed laser, and then are transformed into particles and are deposited on each of the predetermined areas A1 and A2. In this process, the deposits in the predetermined area A1 grow by the deposition of particles coming from the predetermined area A2. Similarly, the deposits in the predetermined area A2 grow by the deposition of particles coming from the predetermined area A3 adjacent to the predetermined area A2. In this way, in the method for manufacturing a member 100 according to this embodiment, it is possible to form an irregular part 13 having microscopic irregularities even on the surface of the thin metal film 12 containing a material having a low melting point, such as Al, as a main component, and thereby to improve adhesion between the metal member 1 and the member 3. Further, in the method for manufacturing a member 100 according to this embodiment, the hydroxyl group formed on the surface of the irregular part 13 is chemically bonded with the isocyanate group formed on the surface of the adhesive 21. As a result, adhesion between the metal member 1 and the member 3 is further improved.

Note that the present invention is not limited to the above-described embodiments, and they can be modified as appropriate within the scope and spirit of the disclosure.

Although the case where the thin metal film 12 is formed on the surface of the base material 11 and the irregular part 13 having irregularities is formed on the surface of the thin metal film 12 has been described as an example in the above-described embodiments, the present disclosure is not limited to this example. For example, the whole or a part of the surface of the base material 11 may be made of a metal material containing Al having a low melting point as a main component, and an irregular part 13 having irregularities may be formed on the surface of the base material 11.

Further, although the case where the metal member 1 of the member 100 is a housing part of a battery pack, and the member 3 is another member such as an upper plate covering the housing part of the battery pack has been described as an example in the above-described embodiment, the present disclosure is not limited to this example. The metal member 1 and the member 3 may be parts of other types of products for which adhesion is required.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a member, the member comprising:
a first member made of a metal, wherein the first member comprises a base material of which at least a surface is made of a material containing Al as a main component, and an irregular part formed as irregularities on the surface of the base material, the irregular part being made of the material used for the surface of the base material, wherein the first member is a housing part of a battery pack; and
an adhesive layer formed on a surface of the irregular part, the adhesive layer comprising an adhesive formed therein, the adhesive having an isocyanate group for bonding the first member with a second member, wherein the second member is a plate material containing Fe that covers the housing part of the battery pack,
the method including:
forming the irregular part on the surface of the base material;
applying the adhesive to the surface of the irregular part;
disposing the second member on the adhesive that has been applied to the surface of the irregular part; and
after disposing the second member on the adhesive that has been applied to the surface of the irregular part, bonding the surface of the irregular part with the adhesive applied to the surface of the irregular part by drying the adhesive, and thereby forming the adhesive layer.

2. The method for manufacturing a member according to claim 1, wherein the adhesive layer is formed by drying the adhesive applied to the surface of the irregular part, and thereby chemically bonding a hydroxyl group formed on the surface of the irregular part with an isocyanate group formed on the surface of the adhesive.

3. The method for manufacturing a member according to claim 1, wherein the adhesive is made of a material containing a urethane resin as a main component.

4. The method for manufacturing a member according to claim 1, wherein
in the formation of the irregular part,
the surface of the base material in a first area on the surface of the base material is melted by applying a pulsed laser beam to the first area,
metal particles are generated from a metal vapor or plasma released into a predetermined atmosphere by melting the surface of the base material in the first area, and deposited in the first area,
the surface of the base material in a second area adjacent to the first area on the surface of the base material is melted by applying a pulsed laser beam to the second area, and
metal particles are generated from a metal vapor or plasma released into the predetermined atmosphere by melting the surface of the base material in the second area, and deposited in each of the second area and the first area adjacent to the second area.

* * * * *